United States Patent
Migishima

(10) Patent No.: US 8,284,432 B2
(45) Date of Patent: Oct. 9, 2012

(54) IMAGE PROCESSING APPARATUS, IMAGE PROCESSING METHOD, AND STORAGE MEDIUM FOR COMBINING A PLURALITY OF IMAGES

(75) Inventor: Isao Migishima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/615,490

(22) Filed: Nov. 10, 2009

(65) Prior Publication Data

US 2010/0118343 A1    May 13, 2010

(30) Foreign Application Priority Data

Nov. 13, 2008   (JP) ................................. 2008-291109

(51) Int. Cl.
*G06F 3/12* (2006.01)

(52) U.S. Cl. ........ 358/1.15; 358/448; 358/453; 358/540
(58) Field of Classification Search .......... 358/1.1–3.23, 358/500–540
See application file for complete search history.

(56) References Cited

U.S. PATENT DOCUMENTS

| 2006/0109280 A1* | 5/2006 | Dawson ........................ 345/611 |
| 2008/0084581 A1* | 4/2008 | Kobayashi et al. .......... 358/1.16 |

FOREIGN PATENT DOCUMENTS

| JP | 2000-253236 A | 9/2000 |
| JP | 2003-023530 A | 1/2003 |
| JP | 2006-094237 A | 4/2006 |

* cited by examiner

*Primary Examiner* — Benny Q Tieu
*Assistant Examiner* — Marcellus Augustin
(74) *Attorney, Agent, or Firm* — Canon USA, Inc., IP Division

(57) ABSTRACT

An image processing apparatus for combining a plurality of images includes a first storage control unit configured to cause a memory to store an image obtained by reading a document by a reading apparatus and having a first resolution, a second storage control unit configured to cause the memory to store an image obtained by reading a vicinity of a region to be combined in the document by the reading apparatus and having a second resolution, which is higher than the first resolution, and a determination unit configured to determine relative positions of a plurality of images stored in the memory by the first storage control unit based on the image stored in the memory by the second storage control unit.

8 Claims, 23 Drawing Sheets

READING OF LOWER IMAGE PORTION

FIG.15
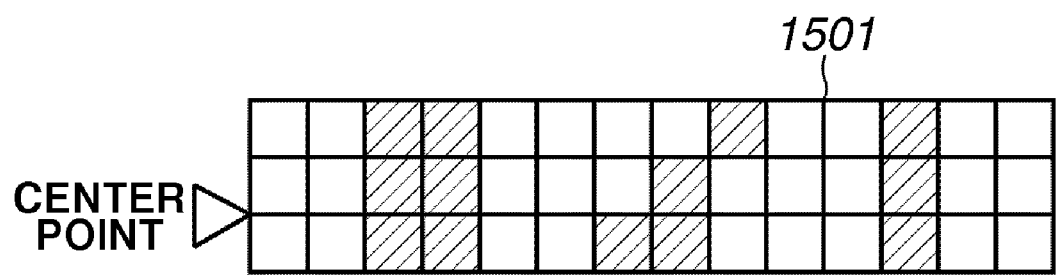
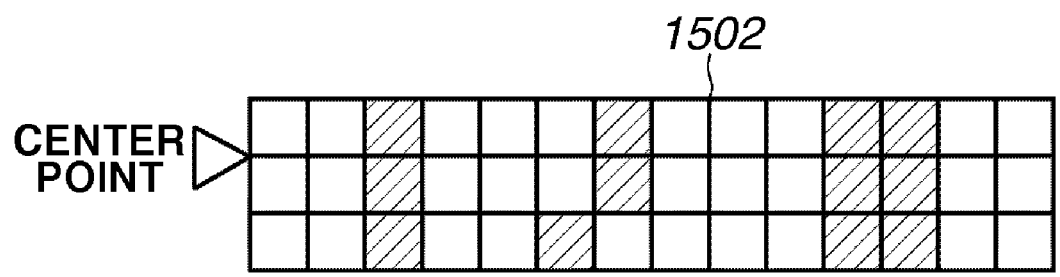

FIG.16
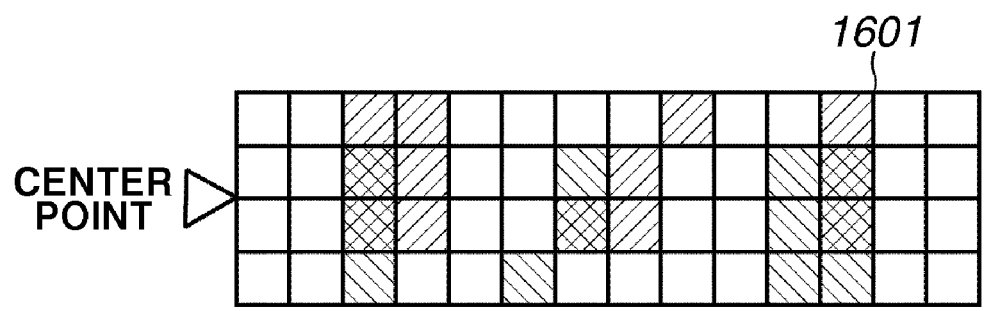
☒ UPPER DOT
☒ LOWER DOT
☒ MATCHED DOT
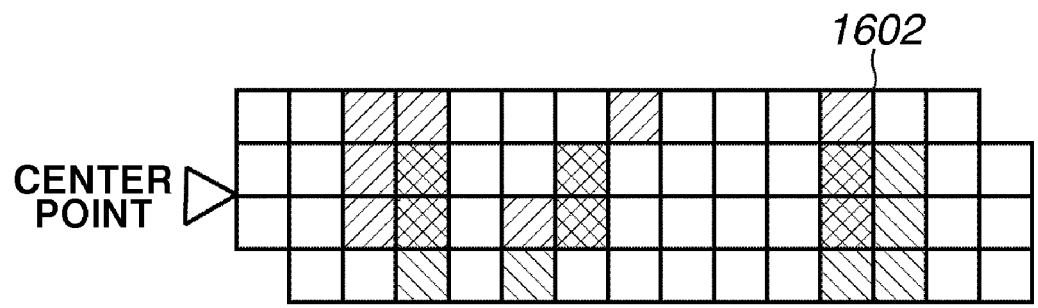

☒ UPPER DOT

☒ LOWER DOT

☒ MATCHED DOT

IMAGE PROCESSING APPARATUS, IMAGE PROCESSING METHOD, AND STORAGE MEDIUM FOR COMBINING A PLURALITY OF IMAGES

BACKGROUND OF THE INVENTION

1. Field of the Invention

The present invention relates to an image processing apparatus that reads one document separately a plurality of times and combines a plurality of read images.

2. Description of the Related Art

There has been proposed an apparatus that reads one document, which is larger than a document positioning plate, a plurality of times, combines a plurality of read images, and prints the resultant. For example, Japanese Patent Application Laid-Open No. 2003-23530 discusses a technique in which an overlapped portion of the image, which is read by dividing one document, is detected, and image data pieces are combined to form one image. With this technique, even from a document, which is larger than a document positioning plate and therefore cannot originally be read, a single image representing the whole document can be acquired.

In the technique described above, there has been disclosed a technique relating to a process of determining a relative position between images, when plural images, which are obtained by reading the divided document, are combined. For example, Japanese Patent Application Laid-Open No. 2006-94237 discusses that, all pieces of the read image data are not used, but only the portion overlapped with the other image data piece is used to compare images for a positional detection. It also discusses that the entire read images are converted into a low resolution, and the images are compared by using these images. By virtue of this, the images can be compared with less quantity of information compared to the case in which the read images are compared as they are. This technique can reduce a load for the process of comparing images, resulting in that the process can be executed at high speed.

In the process of determining the relative position between images, the subject is the precision in positioning the images. For example, when the positions of the images are deviated in a document, such as a ledger sheet, having a continuous line between the divided regions, the line becomes discontinuous to thereby be noticeable. In view of this, the positioning is extremely important in the document described above. A high precision in the positioning can be expected, as the image data has high resolution.

However, in the method for reading the document as being divided as described above, the positioning is performed after the document is read. Therefore, two images have to be stored. Accordingly, there may be the case in which a sufficient storage region that stores two images having high resolution cannot be secured.

SUMMARY OF THE INVENTION

The present invention is directed to an image processing apparatus that can perform high-precise positioning between images, even if a sufficient storage region cannot be secured.

According to an aspect of the present invention, an image processing apparatus for combining a plurality of images includes a first storage control unit configured to cause a memory to store an image obtained by reading a document by a reading apparatus and having a first resolution, a second storage control unit configured to cause the memory to store an image obtained by reading a vicinity of a region to be combined in the document by the reading apparatus and having a second resolution, which is higher than the first resolution, and a determination unit configured to determine relative positions of a plurality of images stored in the memory by the first storage control unit based on the image stored in the memory by the second storage control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 is a view illustrating image data when a combined portion is read.

FIG. 16 is a view illustrating the detail of a comparison process for the combined-portion image data in step S1007 in FIG. 10.

DESCRIPTION OF THE EMBODIMENTS

Various exemplary embodiments, features, and aspects of the invention will be described in detail below with reference to the drawings.

It will be described in the exemplary embodiment of the present invention that a single document, which is larger than a document having a size readable by a document positioning plate, is read separately two or more times. Separate from the images of an image portion obtained by reading the document a plurality of times as described above, an image of a combined portion in the vicinity of a region to be combined is acquired in each of the read images. These combined portions are compared to detect deviation. In the present exemplary embodiment, after the deviation is corrected by using the detected information when the image portion is printed, a printing operation is performed on a print sheet. Specifically, a single A3-size document is read twice on a document positioning plate corresponding to an A4-size sheet, i.e., the upper portion of the document and the lower portion of the document are separately read. Then, the deviation between the combined portions of the upper portion and the lower portion is detected. The detected deviation is specified as a correction value, and an image obtained by combining the upper image portion and the lower image portion is printed.

Figure 1:
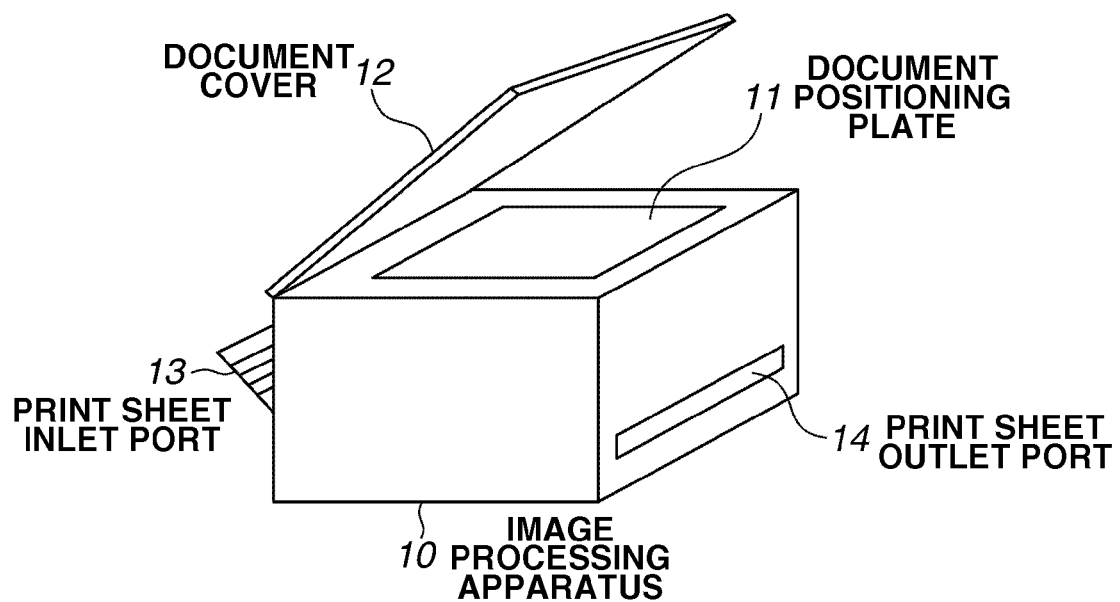
FIG. 1 is a schematic view of an image processing apparatus according to an exemplary embodiment of the present invention.

FIG. 1 is a schematic view of an image processing apparatus 10 according to the exemplary embodiment of the present invention. In FIG. 1, a document positioning plate 11 is used for setting a document when the document is read. A document cover 12 is used for shielding external light when the document is read. A print sheet inlet port 13 is an inlet through which a print sheet is inserted. A print sheet outlet port 14 is an outlet from which a print sheet that has been subject to the printing operation is discharged.

Figure 2:
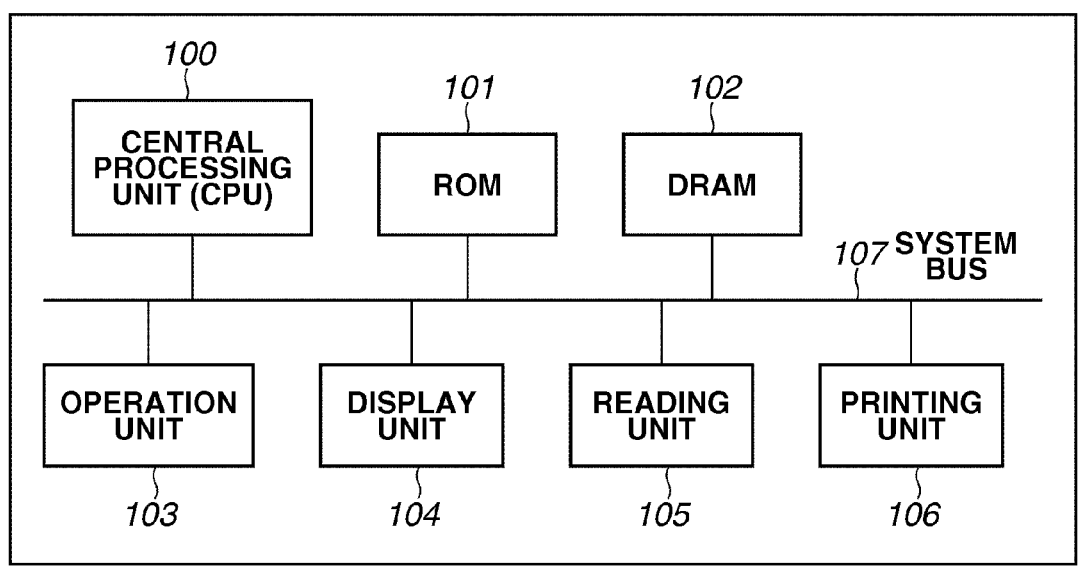
FIG. 2 is a view illustrating an example of a configuration of the image processing apparatus according to the exemplary embodiment of the present invention.

FIG. 2 is a view illustrating an example of the configuration of the image processing apparatus 10 according to the present exemplary embodiment. An image processing apparatus 1010 includes a central processing unit (CPU) 100 that controls the whole apparatus, a ROM 101 that stores a program and data, a storage unit (DRAM) 10 including a temporary storage region such as an image memory, an operation unit 103 including keys operated by a user, a display unit 104 that displays screen information, such as a graphic or message, in color, a reading unit 105 that reads the document, a printing unit 106 having an ink jet mechanism, and a system bus 107 used for data communication among the respective units of the present apparatus.

Figure 3:
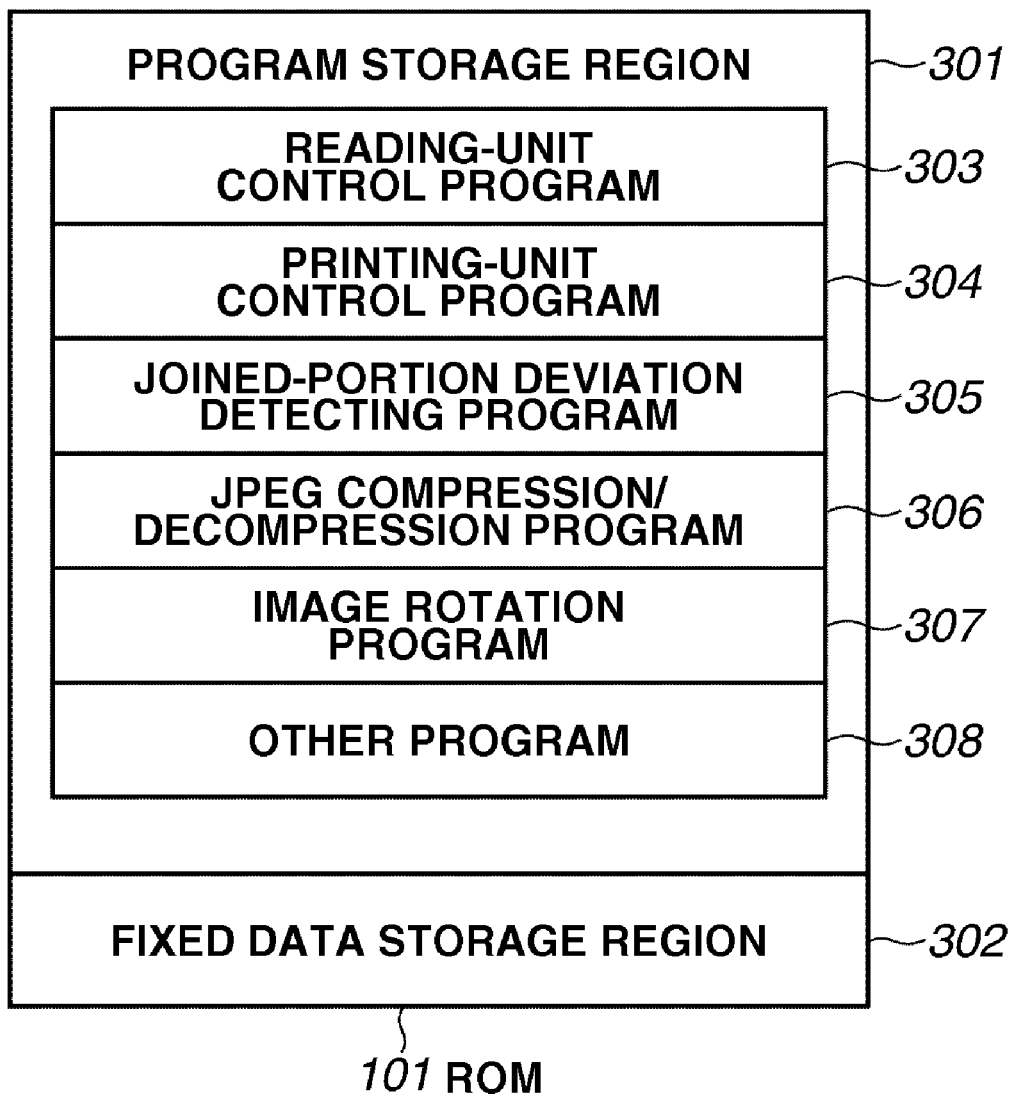
FIG. 3 is a block diagram illustrating an internal configuration of a read-only memory (ROM) of the image processing apparatus.

FIG. 3 is a block diagram illustrating an internal configuration of the ROM 101 in the image processing apparatus. The ROM 101 includes a program storage region 301 and a fixed data storage region 302. The program storage region 301 is divided into blocks described below. A block 303 stores a reading-unit control program for controlling the reading unit 105. A block 304 stores a printing-unit control program for controlling the printing unit 106.

A block 305 stores a combined-portion deviation detecting program for analyzing the correlation between images as a result of the comparison of a plurality of images stored in the DRAM 102 to calculate the deviation of the corresponding images. The detail of the combined-portion deviation detecting program will be described later. A block 306 stores a joint photographic experts group (JPEG) compression/decompression program for performing a JPEG compression/decompression process. A block 307 stores an image rotation program for rotating a combined image and an image-portion image at the lower portion read by the reading unit 105 by 180 degrees. A block 308 stores various other programs such as a display control program for causing the display unit 104 to display the image stored in the DRAM 102. The fixed data storage region 302 stores fixed data such as data about the length of a sheet.

Figure 4:
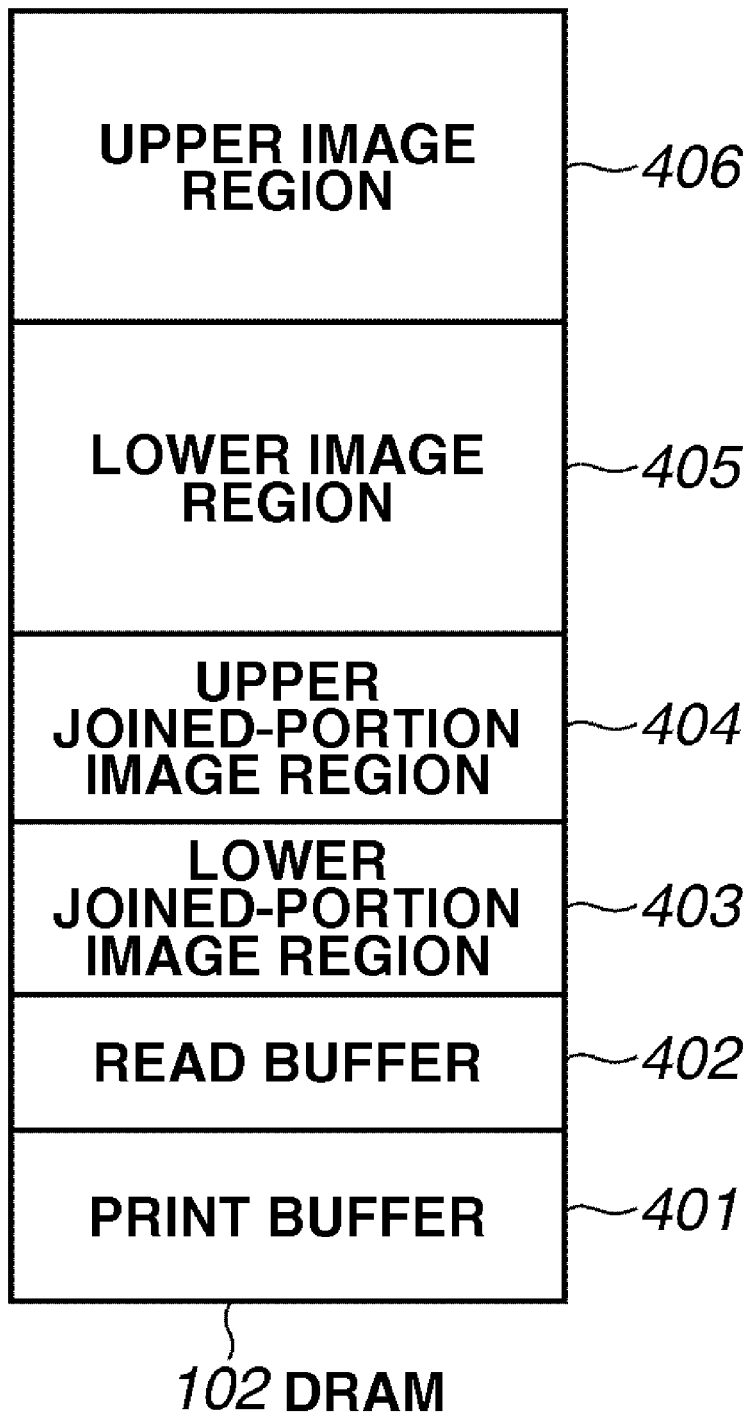
FIG. 4 is a block diagram illustrating an internal configuration of a dynamic random access memory (DRAM) of the image processing apparatus.

FIG. 4 is a block diagram illustrating an internal configuration of the DRAM 102 of the image processing apparatus. An upper image region 406 is for storing image data obtained by reading the upper portion of the document. The reading unit 105 reads the data in a predetermined unit by a read buffer 402, and successively stores the read data in the upper image region 406. A lower image region 405 is for storing image data obtained by reading the lower portion of the document. The manner of storing data is similar to that in the case of the upper image region 406.

An upper combined-portion image region 404 is a region that stores an image corresponding to an upper combined portion, while a lower combined-portion image region 403 is a region that stores an image corresponding to a lower combined portion. A RAW image is desirable as a form for storing the combined portion. The RAW image means an image that is not compressed, and indicates data in which one dot of the image is represented by a red-green-blue (RGB) color space. The RAW image is obtained only by converting the data read by the reading unit 105 into the RGB color space. Therefore, it has no deterioration, and is adapted for a process of detecting deviation at the combined portion compared to the JPEG, which is a normal storage manner.

In the present exemplary embodiment, since a document of A3 size is divided into the upper portion and lower portion, and the document is read twice to be output, the image memory is divided into the upper image region 406 and the lower image region 405. Similarly, the region where the image of the combined portion is stored is divided into the lower combined-portion image region 403 and the upper combined-portion image region 404. When three or more images are to be combined, each of them is divided into three or more blocks. The storage regions corresponding to the number of times the document is read may be prepared, when the document is read a plurality of times as described above. The print buffer 401 is used when the print image data is printed at the printing unit 106.

Figure 5:
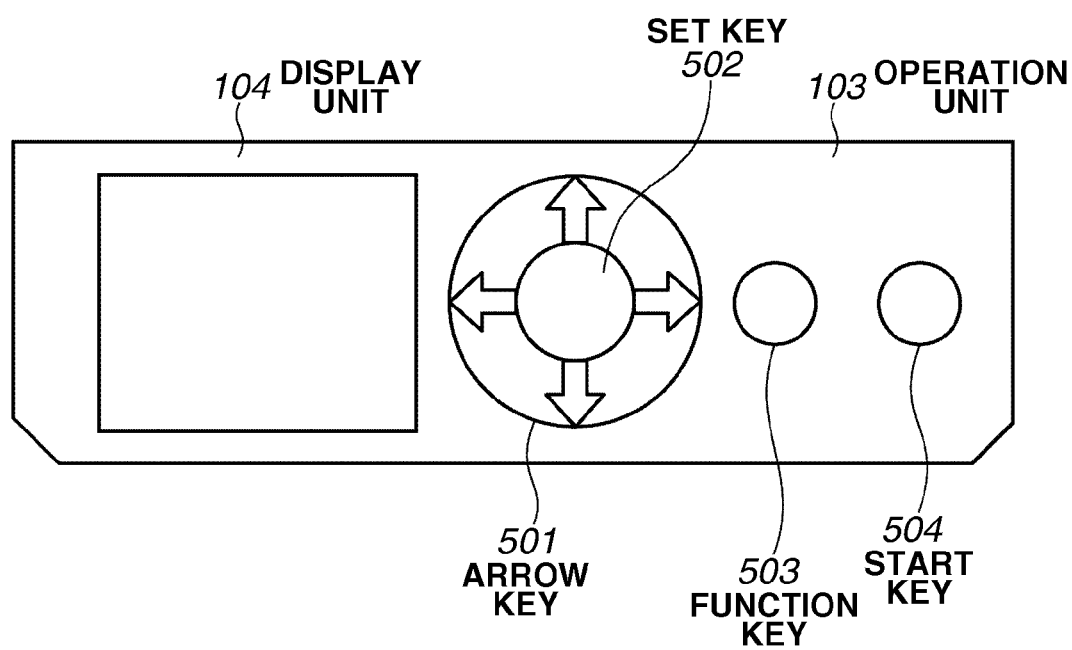
FIG. 5 is a view illustrating a detailed example of the operation unit and the display unit illustrated in FIG. 2.

FIG. 5 is a view of an outer appearance of the operation unit 103 of the image processing apparatus. A display unit 104 is a display screen such as a dot matrix liquid crystal display (LCD). An arrow key 501 is used for moving a cursor at the display unit. A set key 502 is a set/input key. A function key 503 is used for setting functions. A start key 504 is used for executing the function, i.e., for starting the printing, or the like.

The display unit 104 can display the image stored in the DRAM 102 with the display control process by the CPU 100. When a user operates the operation unit 103, the instruction according to the user's operation is input to the CPU 100. Since the CPU 100 executes the control according to the input instruction, the user can give an instruction via the operation unit 103. For example, the CPU 100 displays the image stored in the DRAM 102 on the display screen of the display unit 104, and executes a moving control process for moving the image on the display screen according to the user's instruction.

Figure 6:
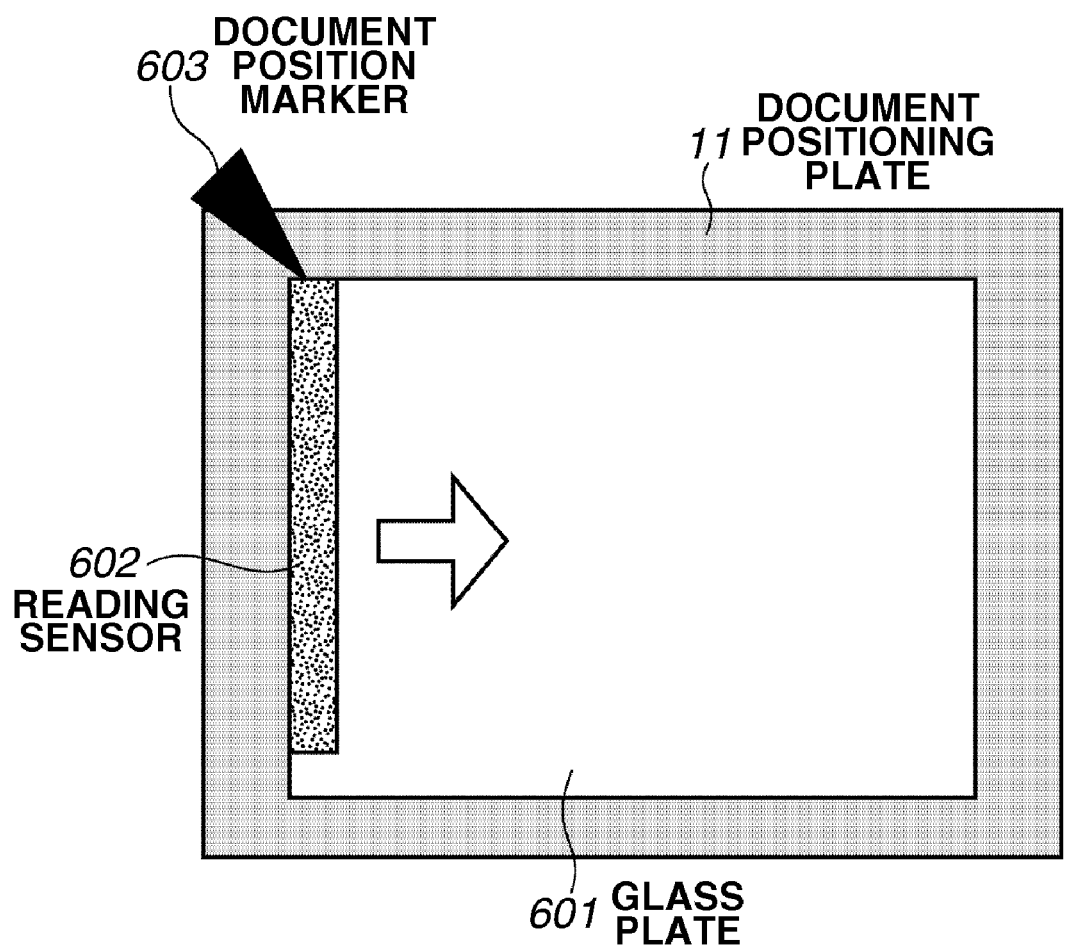
FIG. 6 is a view illustrating a detail of a reading unit of the image processing apparatus.

FIG. 6 is a view illustrating the detail of the reading unit 105 of the image processing apparatus. The reading unit 105 includes a document positioning plate 11, a glass plate 601 on which a document is set, a reading sensor 602 for reading the document, and a document position marker 603 that gives an indication to a user about the position where the document is to be set. The reading sensor 602 moves in the direction indicated in the figure to read the document.

Figure 7:
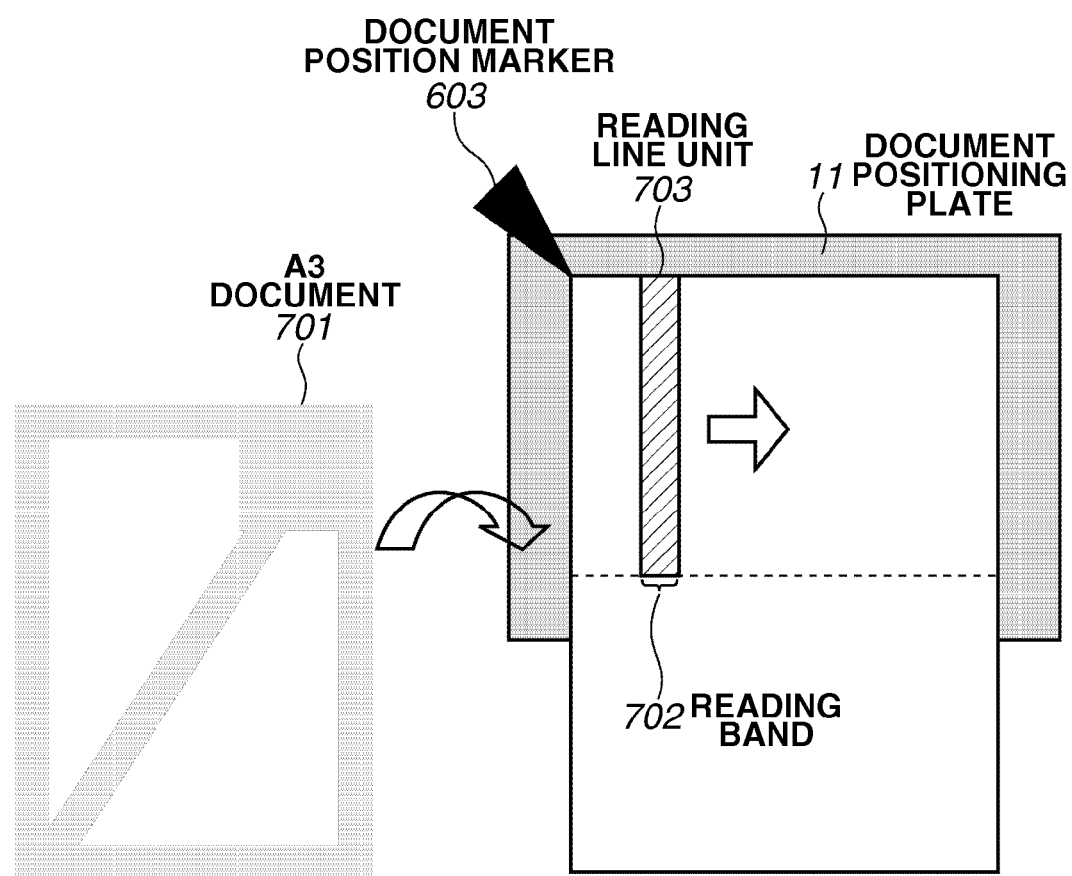
FIG. 7 is a view illustrating an image when an upper portion of an A3-size document is read.

FIG. 7 is a view illustrating an image when the upper portion of the A3-size document is read. FIG. 7 illustrates the case in which the upper portion is read when the A3-size document is placed onto the document positioning plate of A4 size, and the document is read twice, i.e., the upper portion and the lower portion thereof are respectively read, with the use of the reading unit 105 described with reference to FIG. 6. An A3 document 701 is a document to be read. The upper portion of the A3 document 701 is placed onto the glass plate 601 with the read surface facing downward. In this case, the upper left end of the A3 document 701 abuts against the document position marker 603. When the reading is started, the reading sensor 602 reads the upper portion of the A3 document 701 in a unit of the reading band 702. Specifically, the image of the reading line unit 703 in the figure is stored in the read buffer 402.

Figure 8:
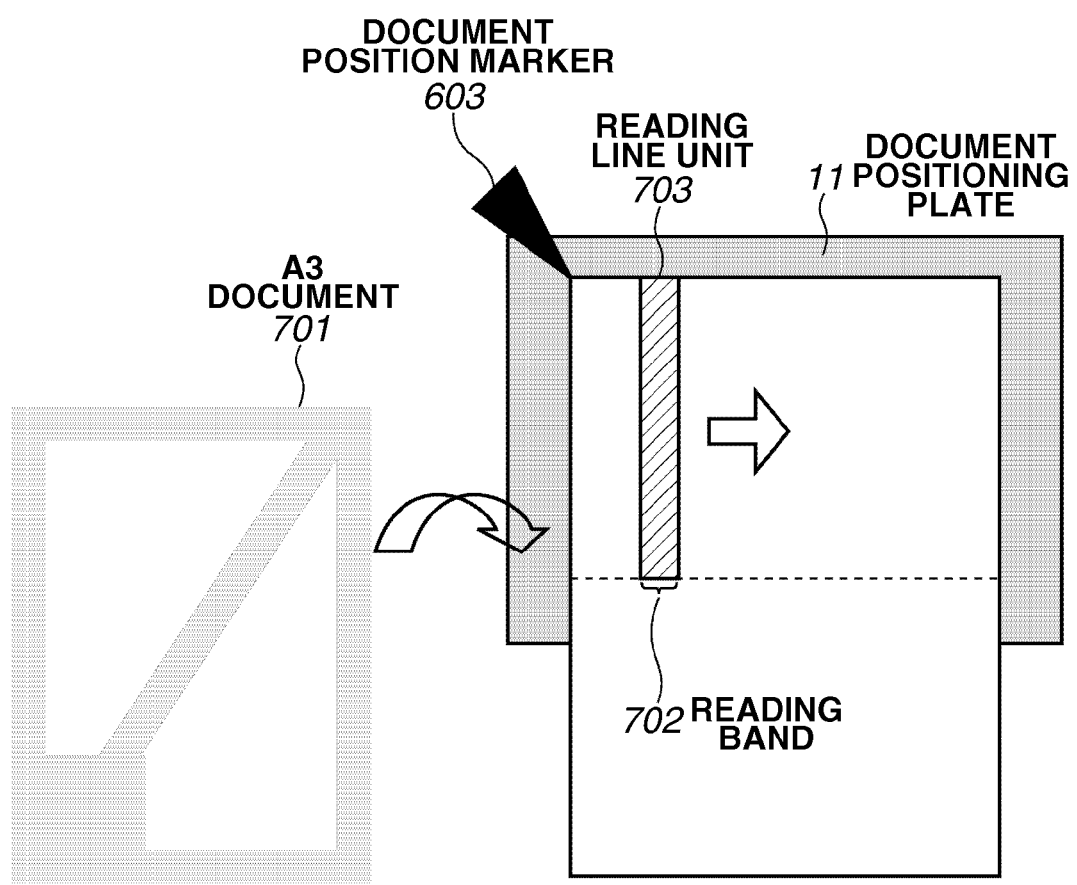
FIG. 8 is a view illustrating an image when a lower portion of an A3-size document is read.

FIG. 8 is a view illustrating an image when the lower portion of the A3 document is read. Like FIG. 7, FIG. 8 illustrates the case in which the lower portion is read when the A3 document is placed onto the document positioning plate of A4 size, and the document is read twice, i.e., the upper portion and the lower portion thereof are respectively read. An A3 document 701 is a document to be read. The document is turned upside down from the state in FIG. 7, and then, the lower portion of the A3 document 701 is set on the glass plate 601 with the read surface facing downward, to read the lower portion. In this case, the lower left end of the A3 document 701 abuts against the document position marker 603. When the reading is started, the reading sensor 602 reads the lower portion of the A3 document 701 in a unit of the reading band 702. Specifically, the image of the reading line unit 703 in the figure is stored in the read buffer 402.

Figure 9:
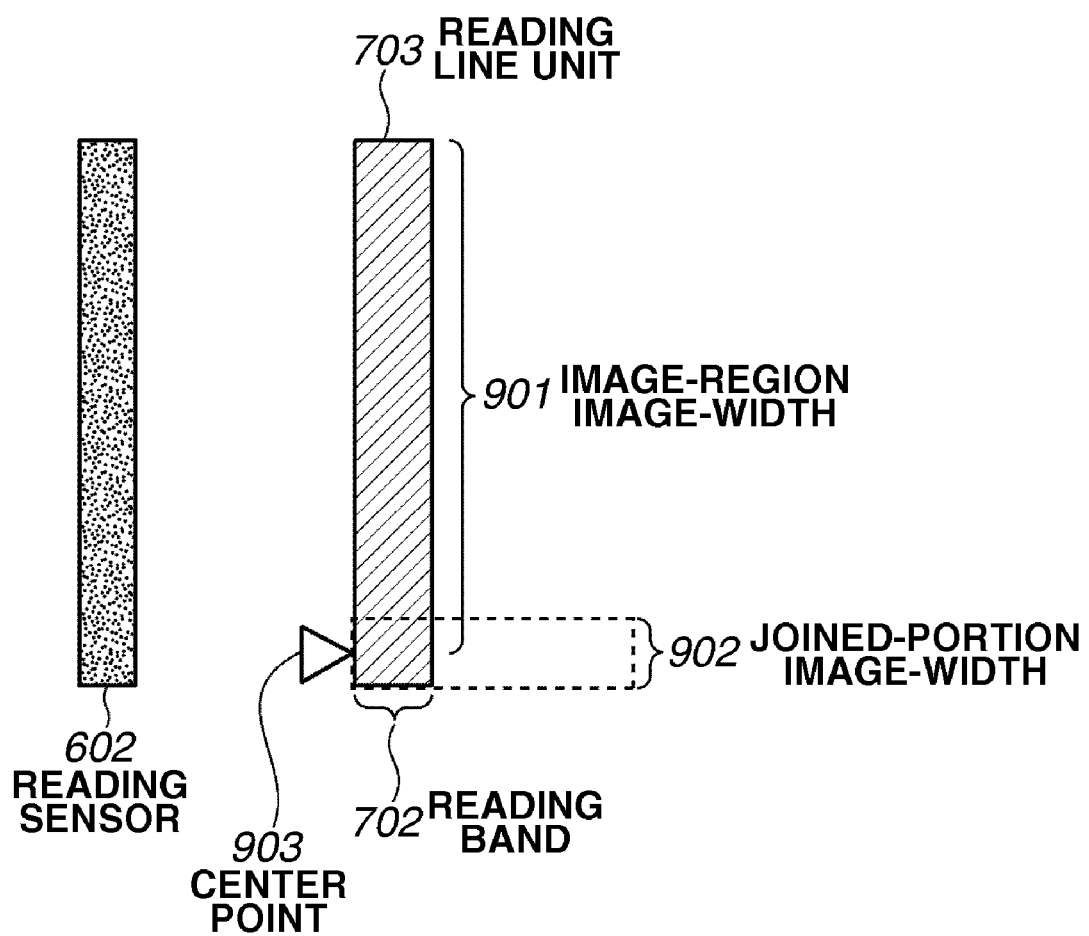
FIG. 9 is a view illustrating a relationship between a reading sensor and a reading range.

FIG. 9 is a view illustrating a relationship between the reading sensor and the reading range. In the present exemplary embodiment, the reading sensor 602 can read the range wider than the short side of A4 size, so that the reading sensor 602 can read the respective upper and the lower combined portions included in the upper and the lower regions of the A3-size document. The image-portion image-width 901 is equal to the width of the short side of A4 size, which is just a half of the A3-size document.

The combined-portion image-width 902 is a portion of the width of the reading sensor 602 corresponding to an image in the vicinity of the region to be combined. In the present exemplary embodiment, the combined-portion image-width 902 is 30 mm. The combined-portion image-width 902 may be changed according to the size of the document. When the document is B4 size that is smaller than A3 size, for example, the portion that is repeatedly read increases when the document is read a plurality of times. In other words, the combined-portion image can be read in a wide range. Therefore, the image width of the combined portion may be set to be wider. Specifically, the image width of the combined portion may be set when a user operates the operation unit 103 to designate the size of the document to be read before the document is read. When the image width of the combined portion is set to be wide as described above, the positioning between the images of the combined portions, which will be described below, can be made more precisely.

Figure 10:
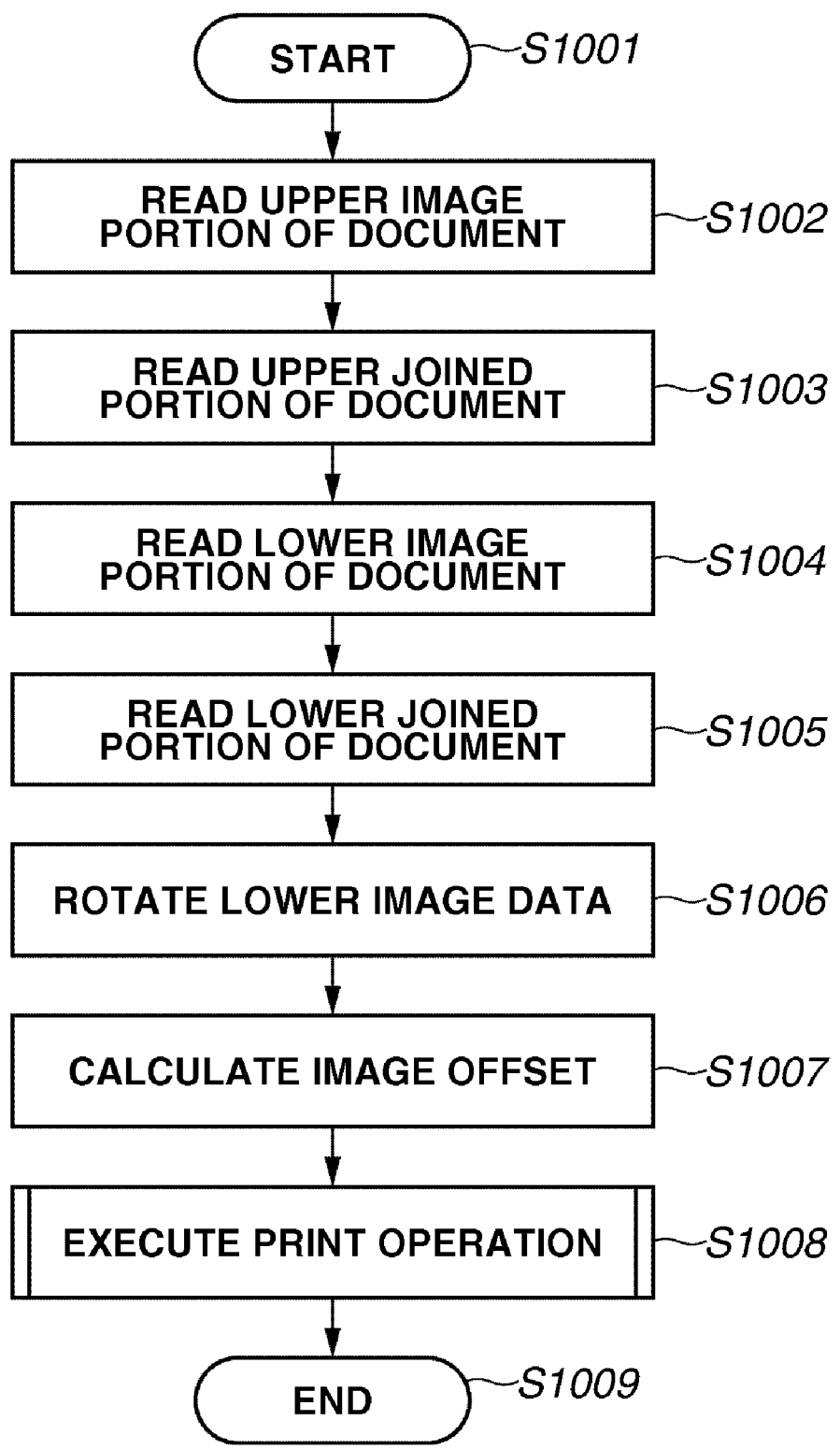
FIG. 10 is a flowchart illustrating an entire process of dividing an image, reading the divided image, and combining the read images.

FIG. 10 is a flowchart illustrating the overall flow of a process of separately reading an image, combining the read images, and printing the resultant. The ROM 101 stores the program for realizing this process, so that the flowchart is realized by the CPU 100 reading and executing this program.

Figure 11:
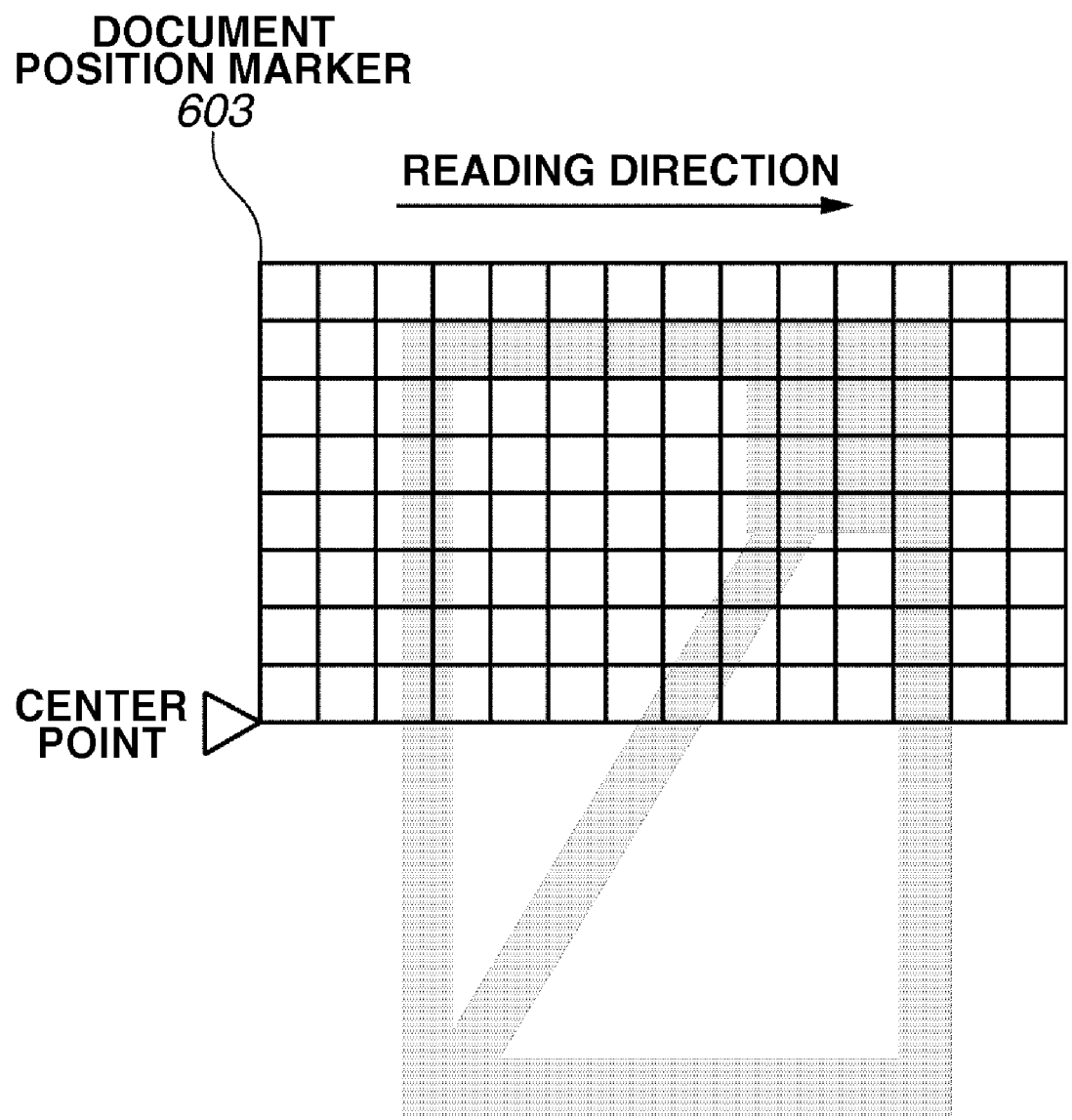
FIG. 11 is a view illustrating a correspondence between the document and pixels illustrated in FIG. 7 during the reading.
Figure 12:
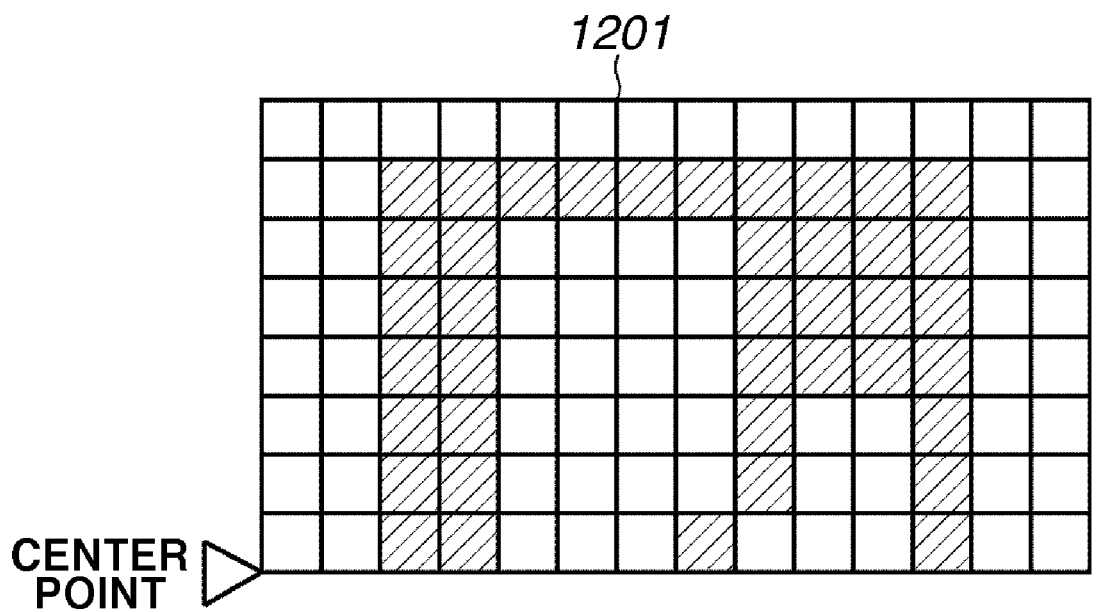
FIG. 12 is a view illustrating the read image-portion image (upper image).

The operation in the conventional case will be described with reference to the flowchart in FIG. 10. The program starts with step S1001, and proceeds to step S1002. In step S1002, the upper image portion of the document is read. FIG. 11 is a view illustrating the correspondence between the document and pixels during the reading illustrated in FIG. 7. The reading is made with the resolution of 600 dpi in step S1002 in the description of the present exemplary embodiment, but in FIG. 11, the correspondence between the document and pixels is illustrated with the pixel being enlarged for simplifying the description. FIG. 12 is a view illustrating the read image-portion image (upper image). In step S1002, this image is stored in the upper image region 406.

In step S1003, the combined-portion image-width 902 illustrated in FIG. 9 is read. FIG. 15 is a view illustrating image data when the combined portion is read. The image read in step S1003 becomes upper combined-portion image data 1501 in FIG. 15, and is stored in the upper combined-portion image region 404.

Figure 13:
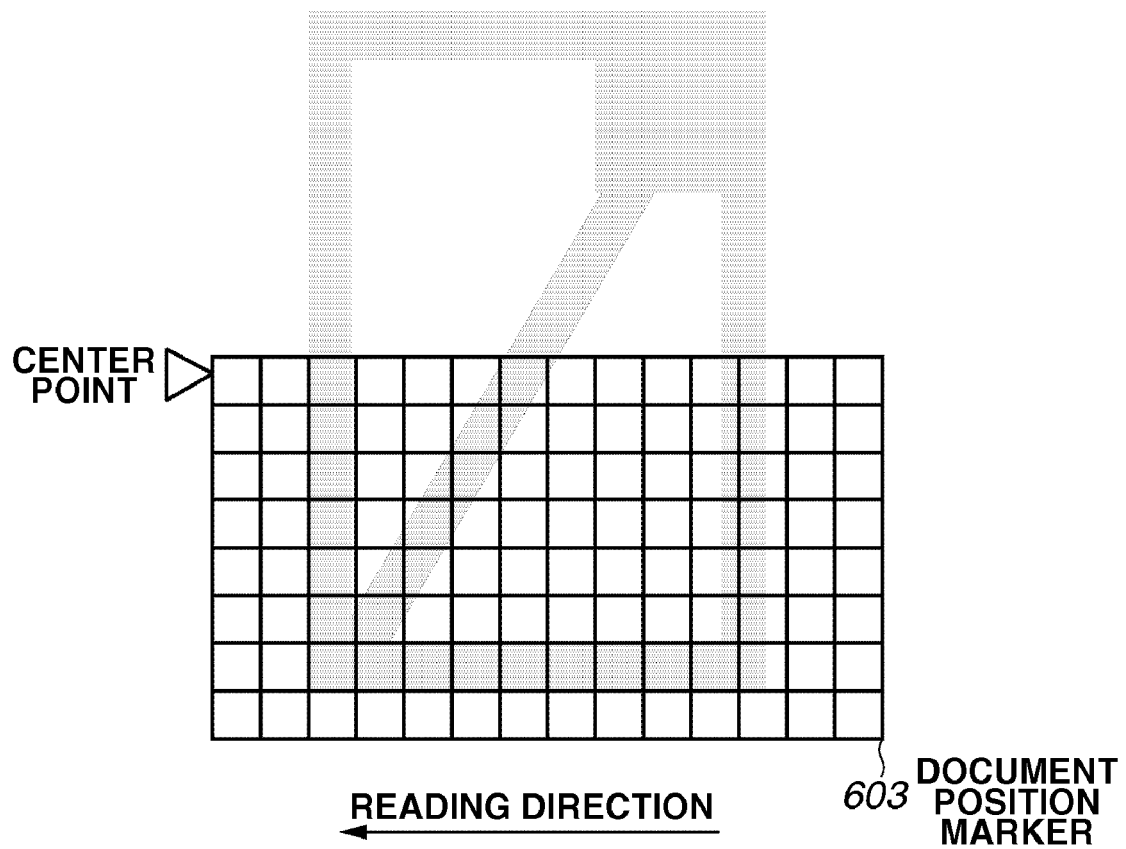
FIG. 13 is a view illustrating a correspondence between the document and pixels illustrated in FIG. 8 during the reading.
Figure 14:
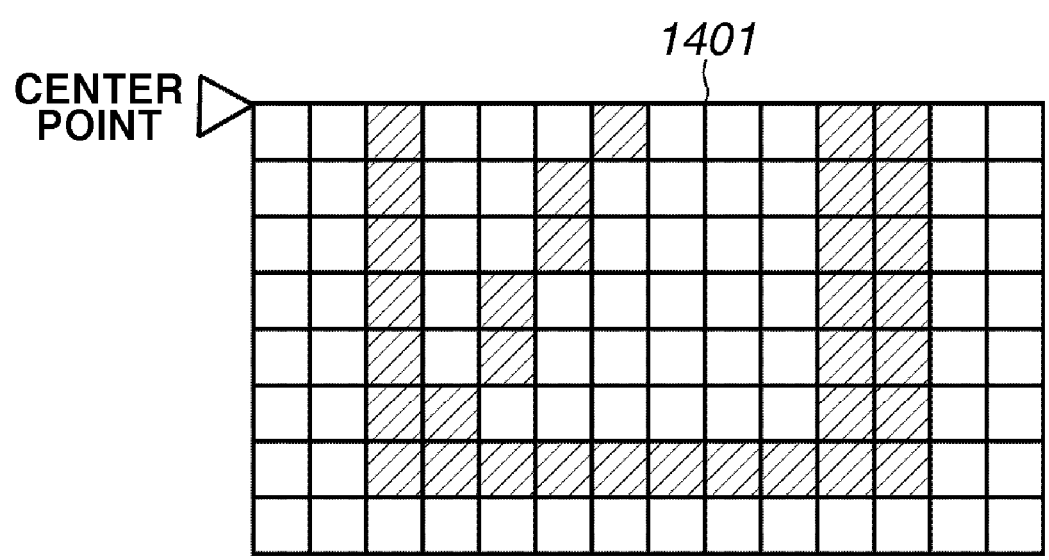
FIG. 14 is a view illustrating the read image-portion image (lower image).

Next, in step S1004, the document is set as being rotated by 180 degrees as illustrated in FIG. 8 to read the image at the lower portion. FIG. 13 is a view illustrating a correspondence between the document and pixels during the reading in FIG. 8. FIG. 14 is a view illustrating the read image-portion image (lower image). The read image becomes the image 1401, and is stored in the lower image region 405. In step S1005, the image of the lower combined portion is read in the same manner as in step S1003. Although the image-portion image and the combined-portion image are read separately, the image-portion image and the combined-portion image can be acquired with one reading. Specifically, the width of the reading sensor other than the image-portion image-width 901 is set as the combined-portion image-width 902. Then, after the reading line unit is read, the image corresponding to the image-portion image-width 901 and the image corresponding to the combined-portion image-width 902 are stored in the respective regions.

In step S1006, the lower image is subject to the rotation process. This process is executed for the following reason. The images stored in the lower image region 405 and the lower combined-portion image region 403 are read as being rotated by 180 degrees to the upper image. Therefore, the lower image is subjected to the 180-degree rotation process by means of the image rotation program 307 to align the lower image with the upper image. The image obtained by performing the 180-degree rotation process to the image stored in the lower-combined-portion image region 403 with the image rotation program 307 is the lower combined-portion image data 1502 illustrated in FIG. 15.

Next, in step S1007, the upper combined-portion image data 1501 stored in the upper combined-portion image region 404 and the lower combined-portion image data 1502 are compared. Specifically, an offset value (correction value) between the combined-portion images that establishes best match of both images is acquired to determine the relative position to be combined. Finally, in step S1008, an image obtained by combining the upper image and the lower image based on the offset value obtained in step S1007 is printed.

FIG. 16 is a view illustrating the detail of the comparison process of the combined-portion-image data pieces in step S1007 in FIG. 10. Specifically, the upper combined-portion image data 1501 and the lower combined-portion image data 1502 are deviated laterally one pixel by one pixel with the center points agreed with each other, wherein the position where the number of matched dots is the largest is detected. The two combined-portion-image data pieces 1601 are only overlapped with each other. On the other hand, the case in which the lower combined-portion image data 1602 is deviated to the right by one pixel with respect to the upper combined-portion image data. It is found that the state represented by 1602 includes the greatest number of the matched dots. As the offset value indicating the combination of the images, +1 is set. The offset is defined as positive when the lower combined-portion image is deviated to the right with respect to the upper combined-portion image, but the reverse case may be applied.

Figure 17:
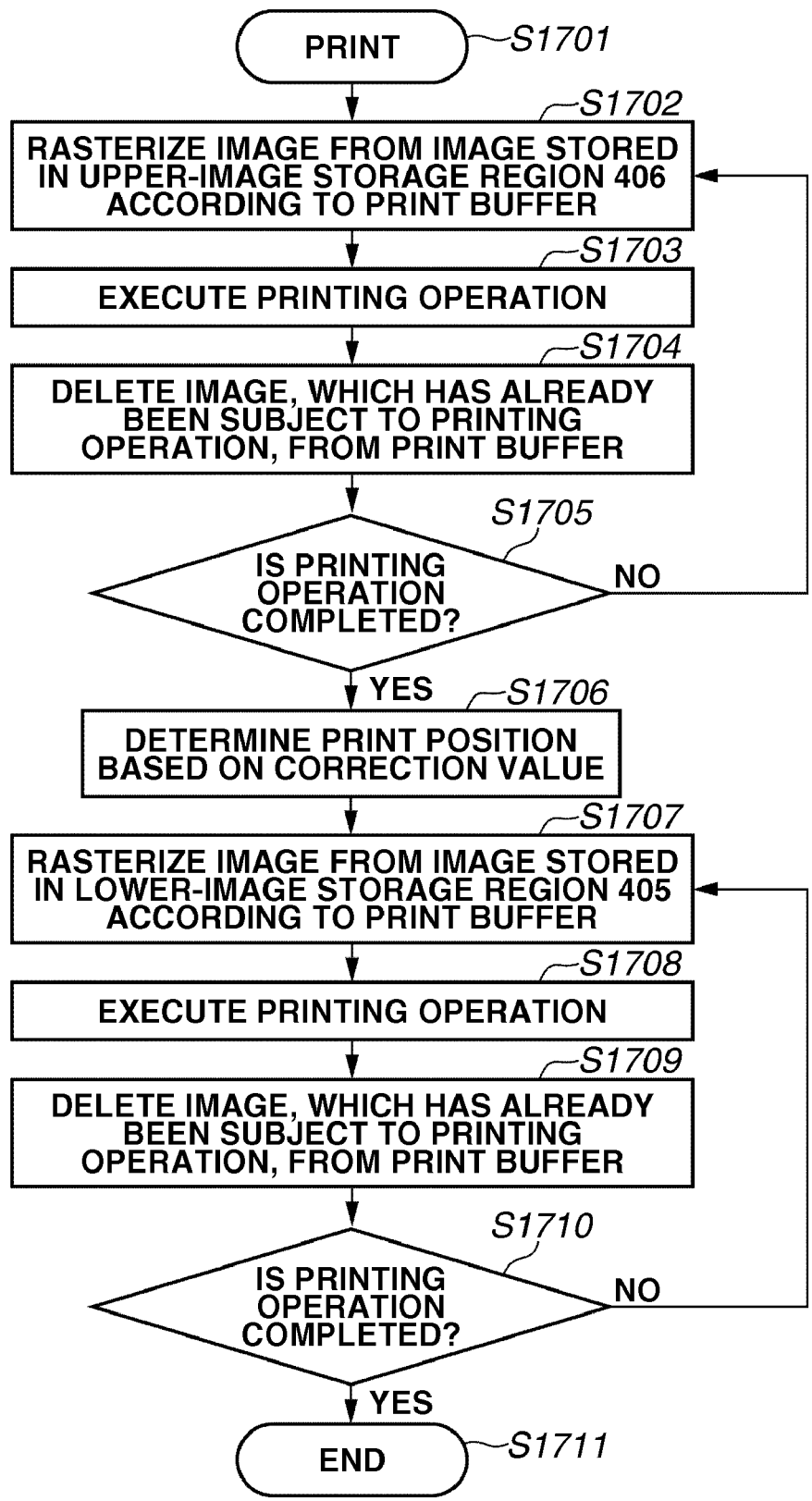
FIG. 17 is a flowchart illustrating a detail of a print control process in step S1008 in FIG. 10.

FIG. 17 is a flowchart illustrating the detail of the print control process in step S1008 in FIG. 10. The program starts with step S1701, and proceeds to step S1702. In step S1702, the CPU 100 rasterizes an image of an amount adapted to the size of the print buffer 401 from the image stored in the upper image region 406, and proceeds to step S1703. In step S1703, the CPU 100 prints the data rasterized in the print buffer 401 with the use of the printing-unit control program 304, and proceeds to step S1704. In step S1704, the CPU 100 deletes the data, which has already been printed, from the print buffer 401, and then, proceeds to step S1705. In step S1705, the CPU 100 determines whether all images in the upper image region 406 are printed. If all images are not printed, the CPU 100 returns to step S1702 to print the next image. If all images are printed, the CPU 100 proceeds to step S1706.

In step S1706, the CPU 100 determines the deviation amount of the lower image based on the offset value (correction value) calculated in step S1007. In this example, +1 is set to the offset value in step S1007. Therefore, when the image is read from the left in the figure, the lower image is read with one pixel delayed from the case in which the lower image is printed with the normal resolution of 600 dpi. In step S1707, the CPU 100 rasterizes an image of an amount adapted to the size of the print buffer 401 from the image stored in the lower image region 405, and proceeds to step S1708. It is to be noted that the CPU 100 performs the printing operation at the print start position according to the result of the process in step S1007. In this case, the lower image is read with one pixel delayed from the normal case. In step S1708, the CPU 100 prints the data rasterized in the print buffer 401 with the use of the printing-unit control program 304, and proceeds to step S1709. In step S1709, the CPU 100 deletes the data, which has already been printed, from the print buffer 401, and then, proceeds to step S1710. In step S1710, the CPU 100 determines whether all images in the lower image region 405 are printed. If all images are not printed, the CPU 100 returns to step S1707 to print the next image. If all images are printed, the CPU 100 proceeds to step S1711 to complete the flow in FIG. 17.

When the offset value by which the print position is determined is negative, i.e., when the start of the print can be made earlier than usual, such as when a margin is set, the start of the print may be made earlier according to the offset value. Alternatively, the start of the print of the upper image may be delayed.

Figure 18:
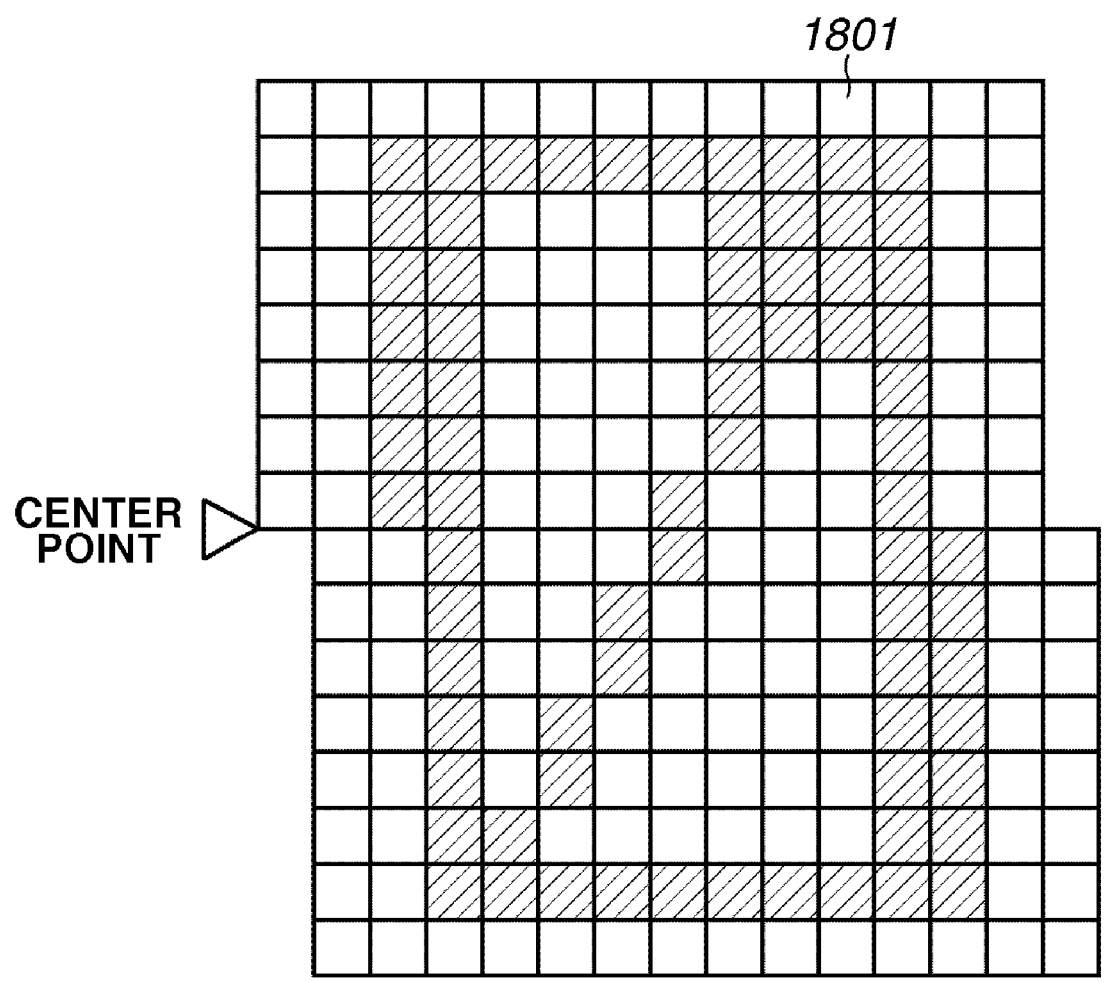
FIG. 18 is a view illustrating an image obtained by combining the images that are read a plurality of times.

FIG. 18 is a view illustrating an image obtained by combining images that are separately read a plurality of times. Comparing the image 1801 in FIG. 18 to the document illustrated in FIG. 7, it is found that the upper image and the lower image are combined as being greatly deviated.

Subsequently, the present exemplary embodiment will be described. The overall process operation is similar to that of the overall flow illustrated in FIG. 10. Notably, in the present exemplary embodiment, the image-portion image data is read with 600 dpi and stored in steps S1002 and S1004, while the combined-portion image data is read with 1200 dpi and stored in steps S1003 and S1005.

Figure 19:
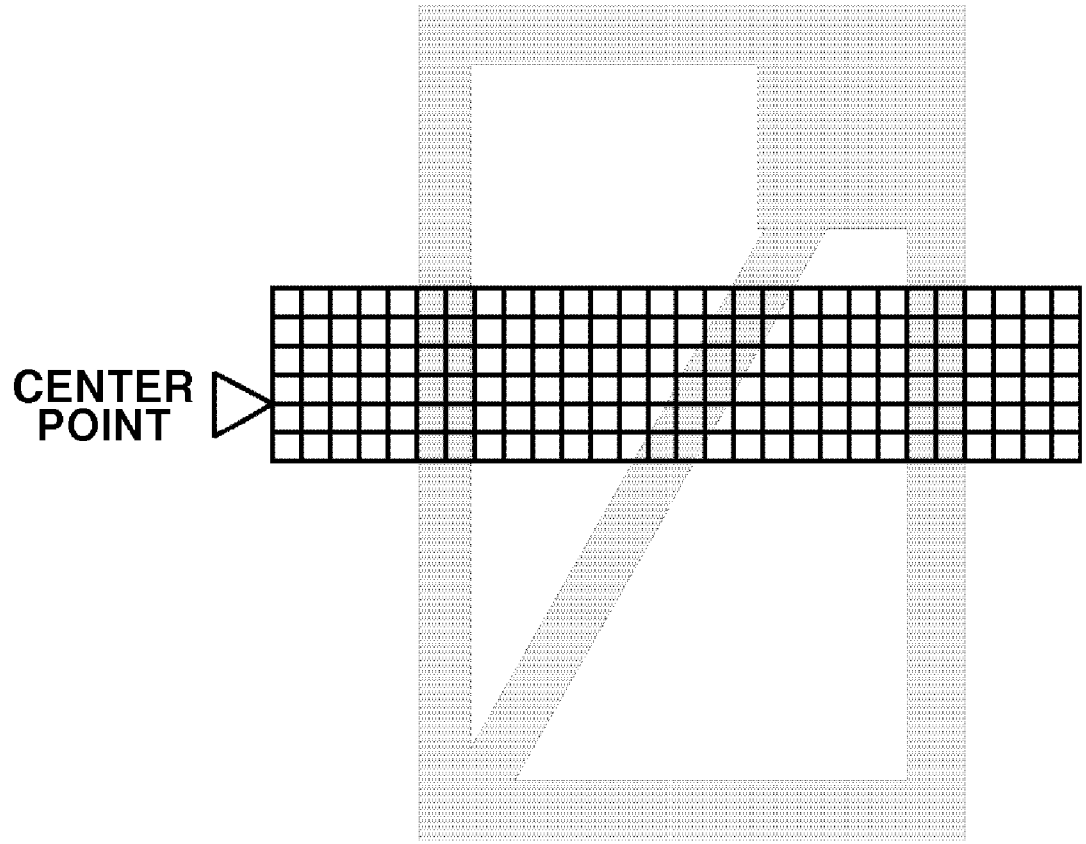
FIG. 19 is a view illustrating the reading of the upper combined portion with high resolution.
Figure 21:
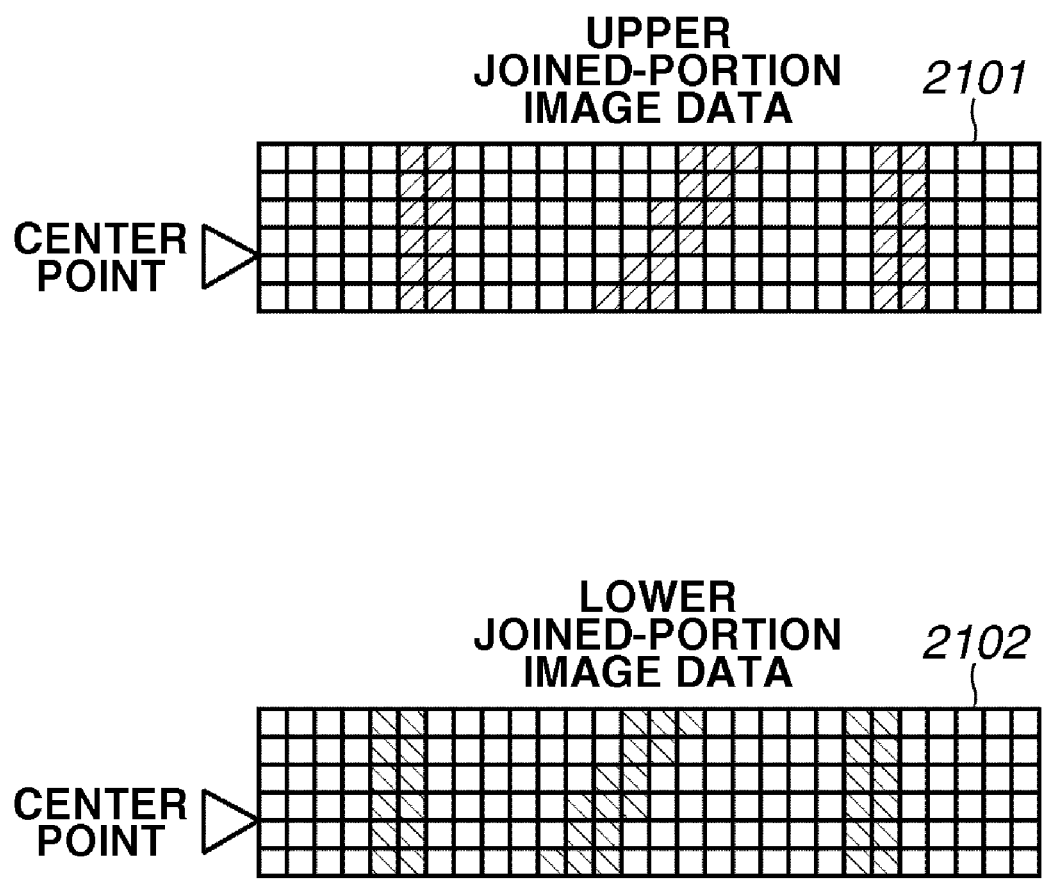
FIG. 21 is a view illustrating combined-portion image data in the present exemplary embodiment.

Firstly, in step S1002, the reading resolution of 600 dpi is set to the reading sensor 602, and then, the upper image is read. This reading is similar to that in the description of FIGS. 7 and 11. The image 1201 illustrated in FIG. 12 is read and stored in the upper image region 406. Next, in step S1003, the reading resolution of 1200 dpi is set, and then, the image corresponding to the combined-image image-width 902 illustrated in FIG. 9 is read. FIG. 19 is a view illustrating the reading of the upper combined portion with high resolution. FIG. 21 illustrates the combined-portion image read with high resolution. The image read in step S1003 becomes the upper combined-portion image data 2101, and is stored in the upper combined-portion image region 404.

When the image portion and the combined portion are read during one reading by the reading sensor, the portion of the reading sensor other than the image-portion image width 901 is defined as the combined-portion image-width. Of the read images, the reading data corresponding to the image-portion image-width may be removed and stored.

Figure 20:
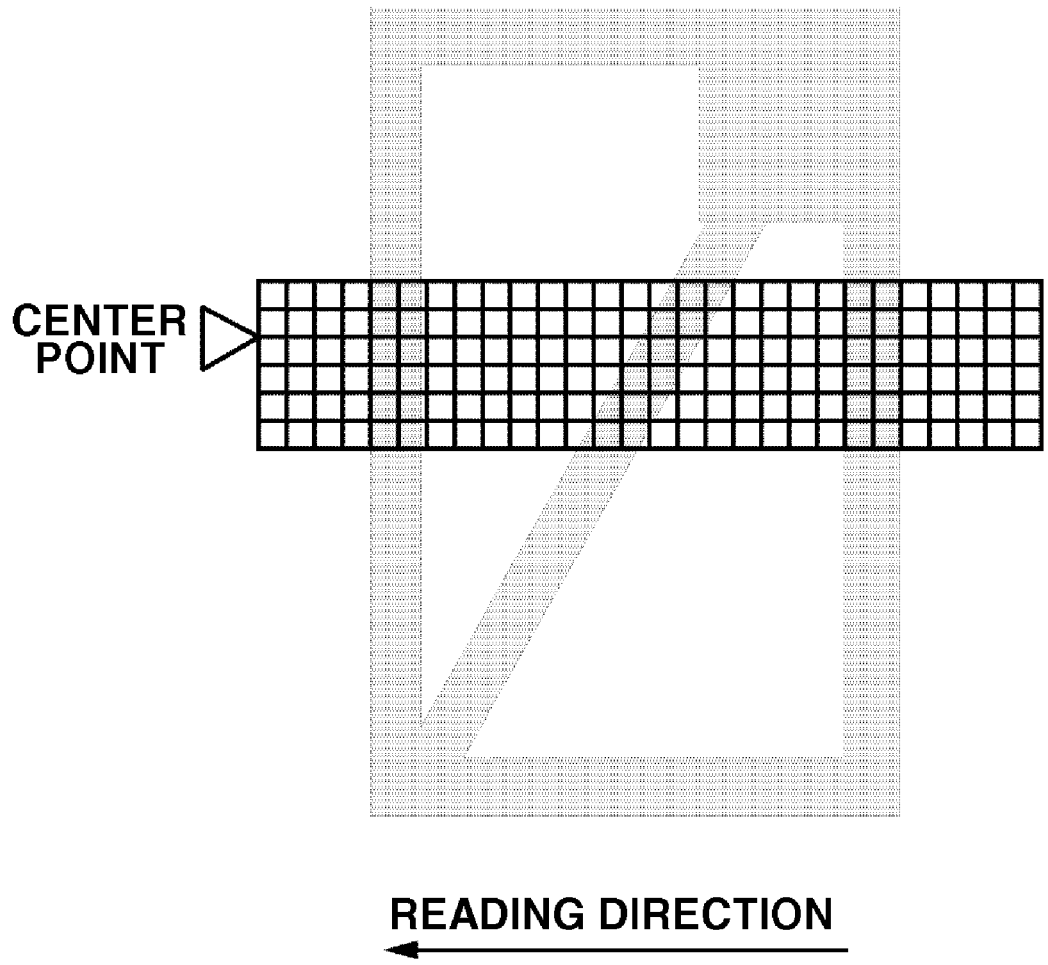
FIG. 20 is a view illustrating the reading of the lower combined portion with high resolution.

Then, in step S1004, the document is set as being rotated by 180 degrees as illustrated in FIG. 8, so that the lower portion of the document is read. This reading is similar to that described in FIGS. 8 and 13. The image 1401 illustrated in FIG. 14 is read and stored in the lower image region 405. In step S1005, the reading resolution of 1200 dpi is set to the reading sensor 602, as in step S1003, and then, the image corresponding to the combined-portion image-width 902 illustrated in FIG. 9 is read. FIG. 20 is a view illustrating the reading of the lower combined portion with high resolution. The read image is stored in the lower combined-portion image region 403. Next, in step S1006, the images stored in the lower image region 405 and the lower combined-portion image region 403 are rotated by 180 degrees by the image rotation program 307. FIG. 21 is a view illustrating the combined-portion-image data in the present exemplary embodiment. The lower combined-image data 2102 is the image obtained by performing the 180-degree rotation process on the image stored in the lower combined-portion image region 403. The image 2102 is stored in the lower combined-portion image region 403.

In step S1007, the upper combined-portion image data 2101 stored in the upper combined-portion image region 404 and the lower combined-portion image data 2101 are compared. Specifically, an offset value (correction value) between the combined-portion images that establishes best match of both images is acquired to determine the relative position between both images.

Figure 22:
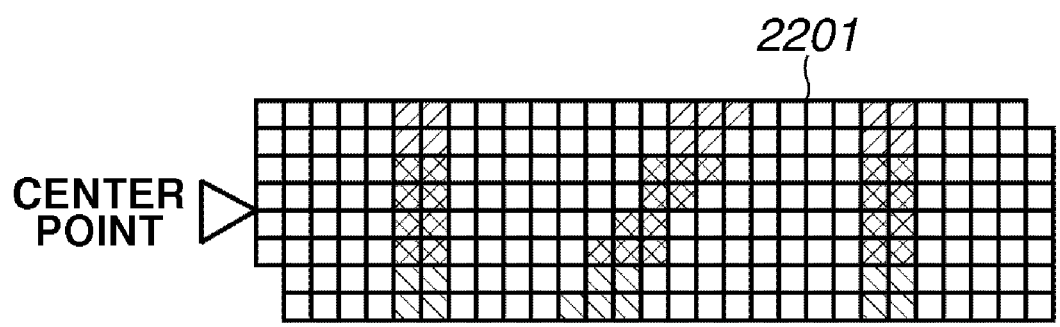
FIG. 22 is a view illustrating a comparison process for the combined-portion image data according to the exemplary embodiment of the present invention.

FIG. 22 is a view illustrating the comparison process of the combined-portion-image data in the present exemplary embodiment. Specifically, the upper combined-portion image data 2101 and the lower combined-portion image data 2102 are deviated laterally one pixel by one pixel with the center points agreed with each other, wherein the position where the number of matched dots is the largest is detected. In this case, the state indicated by 2201 includes the greatest number of the matched dots, so that the horizontal position is deviated by one pixel with 1200 dpi. Specifically, the offset value is detected as +1, and based on the offset value, the printing operation is executed in step S1008. It is useful that the resolution during this printing operation is higher than the reading resolution of the image-portion image.

Finally, in step S1008, the image obtained by combining the upper image and the lower image is printed. This process is similar to that of the flowchart in FIG. 11. It is to be noted that, in step S1706, the correction is performed according to the pixels with 1200 dpi. Specifically, when the printing is performed with 1200 dpi, the correction is made such that the lower image is deviated to the right in the figure by one pixel since the offset value is +1. In other words, if the pixels are read from the left in the figure when the image data is read from the print buffer in step S1707, the image is read as delayed by one pixel than usual. Alternatively, in the case of an apparatus that records an image by scanning a recording head and ejecting ink, the print position may be adjusted by adjusting the scanning speed or the ink discharging timing.

Figure 23:
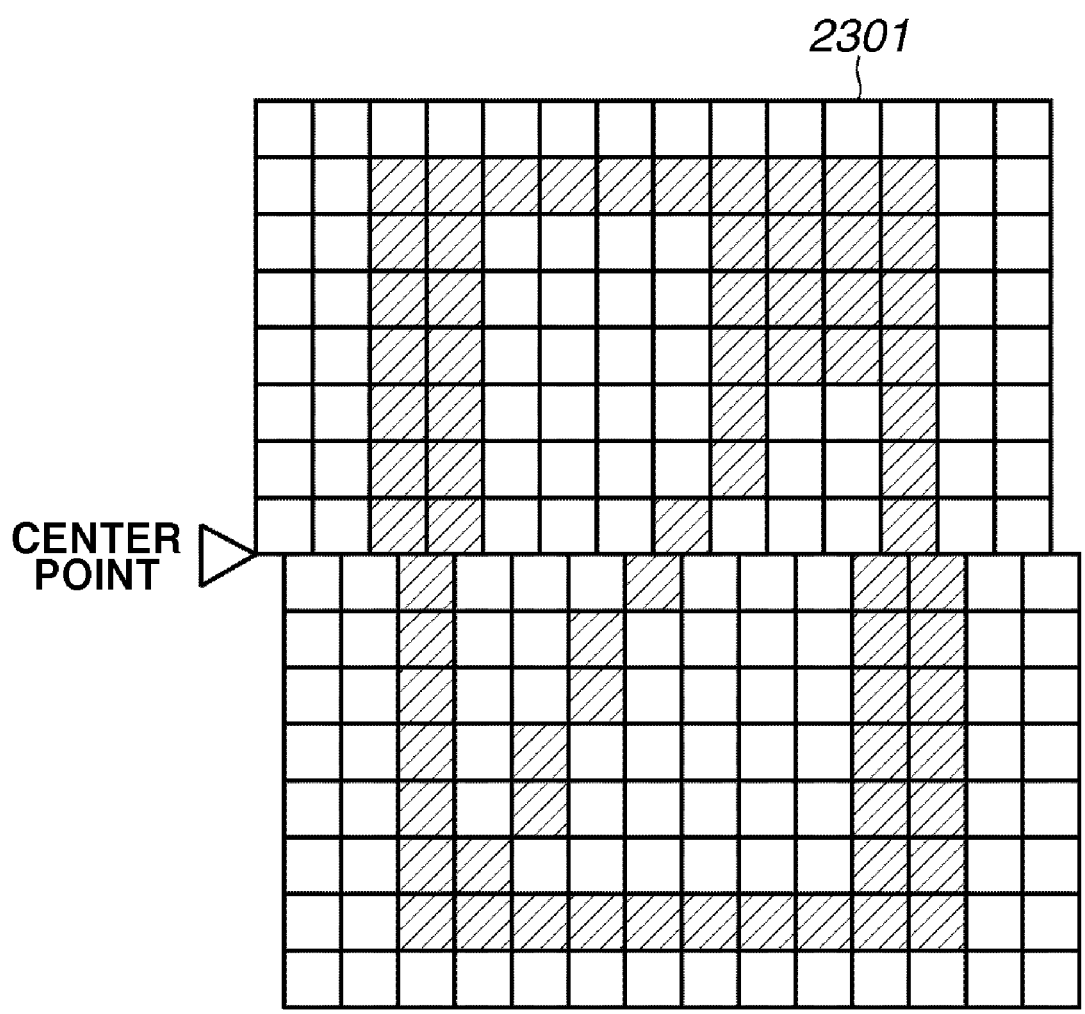
FIG. 23 is a view illustrating an image obtained by combining the read images according to the exemplary embodiment of the present invention.

The effect obtained by the exemplary embodiment described above will be described below. FIG. 23 is a view illustrating an image obtained by combining the read images according to the present exemplary embodiment. Since the image can be combined as being corrected finely than usual, the image can be combined with high precision. Actually, it is found that the image 2301 in FIG. 23 is closer to the original image than the image 1801 in FIG. 18, which is the output result in the conventional case. The present exemplary embodiment describes the case in which the printing resolution is higher than the reading resolution of the image-portion image. However, even if the printing resolution is 600 dpi, which is the same as the reading resolution of the image-portion image, the possibility of combining the images at a more appropriate position through the positioning between the images with high resolution increases, and therefore, the exemplary embodiment provides an effect.

The combined portion is read with the resolution higher than the resolution of the image portion to detect the position of the image, so that the quality of the printed product can be enhanced. Since the whole image is read with the resolution lower than the resolution of reading the combined portion, the storage capacity for storing the read image can be reduced.

In the above description, the center point is set to the read image, and the positioning of the image and the adjustment of the print position in the horizontal direction are described. However, the positioning in the vertical direction, in addition to the positioning in the horizontal direction, can be performed in the same manner as described above.

In the exemplary embodiment described above, various techniques have been proposed such as the technique using an image correlation function, in addition to the method for determining the relative position where the number of the matched dots is the greatest, as the process of analyzing the correlation of the combined-portion image. The present invention may employ these techniques.

Except for the method for analyzing the correlation between the images, the combined-portion image is displayed on the display screen of the display unit 104, and a user operates the arrow key 501 for moving the combined-portion image on the display screen, to make a positioning. In the movement control process, the combined-portion image moves on the display screen of the display unit 104 according to the operation of the arrow key 501 in a unit of a display pixel, so that the effect of reading the combined-portion image with high resolution can be obtained as in the present invention.

Further, the apparatus including the reading apparatus and the printing apparatus integrally formed is described above. However, the present invention is not limited thereto. The present invention is applicable to an apparatus, such as a personal computer, in which an image read by an external reading apparatus is input, and the input image is printed by a printing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-291109 filed Nov. 13, 2008, which is hereby incorporated by reference herein in its entirety.

What is claimed is:

1. An image processing apparatus for combining a plurality of images, the image processing apparatus comprising:
a first acquisition unit configured to acquire a read image obtained by reading an original by a reading apparatus as an image to be combined, so that the read image has a first resolution;
a second acquisition unit configured to acquire a combining image obtained by reading a combining portion of the original by the reading apparatus separately from the combining image included in the image to be combined acquired by the first acquisition unit, so that the combining image has a second resolution, which is higher than the first resolution;
a determination unit configured to determine, in response to a plurality of images to be combined being acquired by the first acquisition unit and the combining images in the respective plurality of images being acquired by the second acquisition unit, a layout in a combining of the plurality of images based on the combining images; and
an outputting unit configured to output the plurality of images having the first resolution so that the plurality of images are combined according to the layout determined by the determining unit.

2. The image processing apparatus according to claim 1, wherein the outputting unit is configured to cause a printing apparatus to print the plurality of images, which are acquired by the first acquisition unit according to the layout determined by the determination unit.

3. The image processing apparatus according to claim 2, wherein the outputting unit is configured to cause at least one image of the plurality of images acquired by the first acquisition unit to be printed at a print start position according to the layout determined by the determination unit.

4. The image processing apparatus according to claim 3, wherein the outputting unit is configured to cause the printing apparatus to perform a printing operation with a third resolution that is higher than the first resolution.

5. The image processing apparatus according to claim 1, wherein the determination unit analyzes a correlation of the combining images acquired by the second acquisition unit, and determines the layout of the plurality of images acquired by the first acquisition unit according to a result of the analysis by the determination unit.

6. The image processing apparatus according to claim 1, further comprising:
a display control unit configured to display the combining image acquired by the second acquisition unit on a display screen; and
a moving control unit configured to move the image displayed on the display screen by the display control unit on the display screen according to an input instruction,
wherein the determination unit determines the layout of the plurality of images acquired by the first acquisition unit based on the movement of the image by the moving control unit.

7. An image processing method for combining a plurality of images, the image processing method comprising:
acquiring a read image obtained by reading an original by a reading apparatus as an image to be combined, so that the read image has a first resolution;
acquiring a combining image obtained by reading a combining portion of the original by the reading apparatus separately from the combining image included in the acquired image to be combined, so that the combining image has a second resolution which is higher than the first resolution;
determining, using a central processing unit and in response to a plurality of images to be combined being acquired and the combining images in the respective plurality of images being acquired, a layout in a combining of the plurality of images based on the combining images; and
outputting the plurality of images having the first resolution so that the plurality of images are combined according to the determined layout.

8. A non-transitory computer-readable storage medium storing a program that causes an image processing apparatus to perform the method according to claim 7.

* * * * *